June 14, 1927.
M. W. McCONKEY
1,632,140
BRAKE CONTROL
Original Filed March 24, 1923
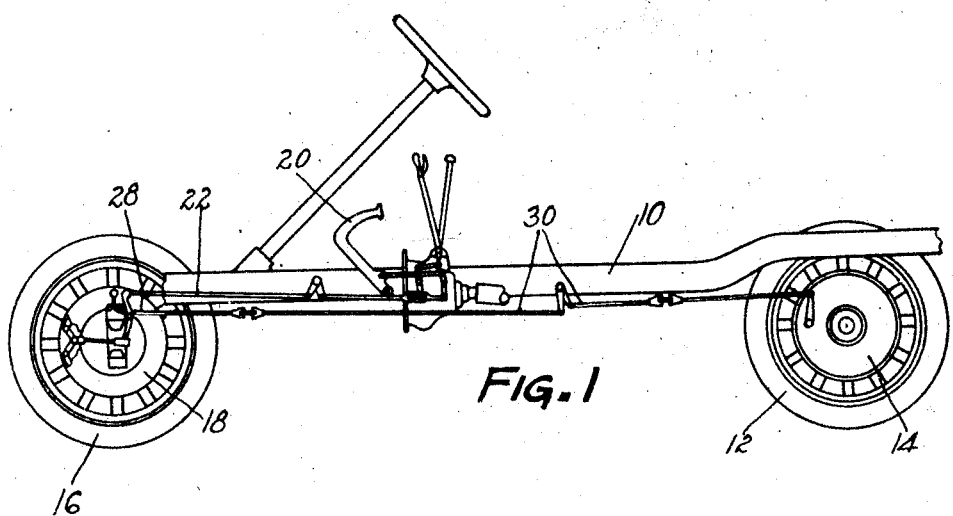
FIG. 1
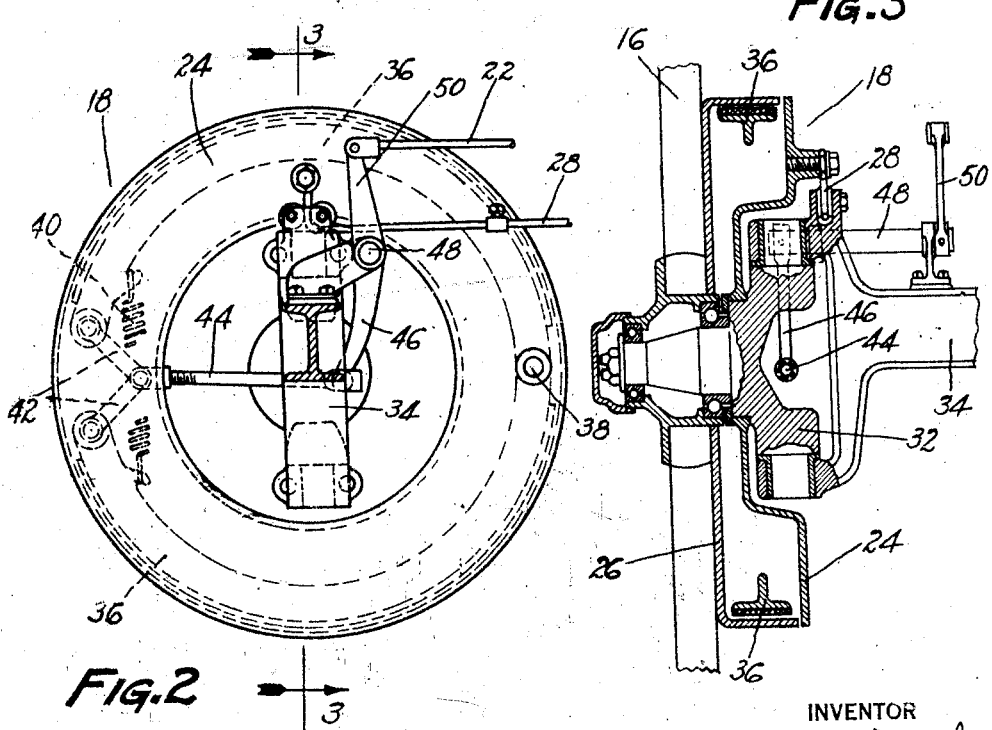
FIG. 2
FIG. 3
INVENTOR
Montgomery W. McConkey Patented June 14, 1927.

1,632,140

UNITED STATES PATENT OFFICE.

MONTGOMERY W. McCONKEY, OF CHICAGO, ILLINOIS, ASSIGNOR TO BENDIX BRAKE COMPANY, OF CHICAGO, ILLINOIS, A CORPORATION OF ILLINOIS.

BRAKE CONTROL.

Original application filed March 24, 1923, Serial No. 627,439. Divided and this application filed June 13, 1925. Serial No. 36,846.

This invention relates to brakes, and is illustrated as embodied in an automobile chassis having brakes on all four wheels. An object of the invention is to simplify the control connections of a brake for a swivelled wheel, such as the front brake of an automobile, by arranging the swivelling and non-swivelling parts of the connections so that their point of engagement moves in applying the brake from an idle position spaced from the swivelling axis to an active position substantially in that axis, instead of requiring the use of a joint at all times in the swivelling axis. In one desirable arrangement, a lever is arranged to apply the brake, its end being connected to the parts swivelling with the wheel and being movable as described toward the axis to an active position substantially in the axis.

Another important feature of the invention relates to the use, in brake-operating connections, of a universal joint or its equivalent with the double function of permitting the swivelling of the wheel and of permitting a slight lateral or circumferential shifting of the brake or of an applying device for the brake. Preferably the joint or the like is arranged, at least when the brake is applied, at the intersection of the swivelling axis of the wheel with an axis about which the brake or the brake-applying device may shift.

The above and other objects and features of the invention, including various novel combinations of parts and desirable particular constructions, will be apparent from the following description of one illustrative embodiment shown in the accompanying drawings, in which:

Figure 1 is a diagrammatic longitudinal vertical section through the chassis, showing the hookup;

Figure 2 is a vertical section looking outwardly at one front brake; and

Figure 3 is a vertical section, on the line 3—3 of Figure 2, through the brake.

In the arrangement illustrated, the invention is embodied in an automobile chassis including a frame 10 supported on rear wheels 12 having brakes 14, and front wheels 16 having brakes 18. The brakes are applied by depression of a pedal 20 operating links or cables 22 extending to the front brakes 18. The backing plate 24 of each front brake has a limited angular movement with the drum 26, when the brake is applied, to operate cables 28 and connections 30 to apply the rear brakes 14. The above-described general arrangement forms the subject-matter of my co-pending application No. 627,439, filed March 24, 1923, of which the present application is a division.

The present application relates to the control through which each brake 18 is applied, without interfering with the swivelling movement of wheels 16, each of which is rotatably mounted on a knuckle 32 swivelled at one end of the axle 34.

Each brake 18 is preferably of the expanding type, and is shown as including a friction device consisting of shoes 36 pivoted at 38 on the backing plate 24. The shoes are expanded against the resistance of a spring 40 by a toggle 42 engaging their free ends, and operated by a member shown as a link 44. The opposite end of the link is universally jointed, or otherwise engaged, by one end of a lever 46, fulcrumed on a shaft 48 carried by the axle 34, and operated by an arm 50 connected to the link or cable 22. It is to be especially noted that the point of engagement of lever 46 and link 44, or their equivalents, is not at all times in the swivelling axis, as in prior constructions, but is movable at right angles to the swivelling axis from an idle position spaced from the swivelling axis parallel to the wheel 16 to an active position substantially in the swivelling axis.

Also it is to be noted that the joint at the end of the lever is arranged, when the brake is applied, at the intersection of the swivelling axis of the wheel with the axis about which toggle 42, or other applying device, shifts when the brake turns. Thus the joint has the double function of permitting the swivelling of the wheel and the shifting of the applying device, and in fact of the entire brake.

While one illustrative embodiment of the invention has been described in detail, it is not my intention to limit its scope to that particular embodiment or otherwise than by the terms of the appended claims.

I claim:

1. A vehicle having, in combination, a swivelled wheel having a brake, and operating connections for the brake including a power-multiplying brake-operating device swivelling with the wheel and a non-swivelling cooperating part having a point of engagement movable in applying the brake substantially in a plane perpendicular to the swivelling axis from an idle position spaced from the swivelling axis to an active position substantially in that axis.

2. A vehicle having, in combination, a swivelled wheel having a brake, and operating connections for the brake including a power-multiplying brake-operating device swivelling with the wheel and a non-swivelling cooperating part having a point of engagement movable in applying the brake substantially at right angles to the swivelling axis to an active position substantially in that axis.

3. A vehicle having, in combination, a swivelled wheel having a brake, and brake-operating connections including a joint permitting swivelling of the wheel and movable substantially at right angles to the swivelling axis to an active position substantially in that axis.

4. A vehicle having, in combination, a swivelled wheel having an expansible and contractable brake, and brake-operating connections including a universally-movable joint movable perpendicularly to the swivelling axis from an idle position spaced from the swivelling axis to an active position substantially in that axis.

5. A vehicle having, in combination, a swivelled wheel having an expansible and contractable brake having adjacent free ends, and brake-operating connections including operating means engaging both free ends and a member controlling the operating means having a part engaging said means which is movable substantially perpendicular to the swivelling axis from an idle position spaced from the swivelling axis to an active position substantially in that axis.

6. A vehicle having, in combination, a swivelled wheel having an expansible brake, a toggle for expanding the brake, and toggle-operating means including a joint movable in expanding the brake from an idle position spaced from the swivelling axis to an active position substantially in that axis.

7. A vehicle having, in combination, a swivelled wheel having a brake, a brake-operating device swivelling with the wheel, a non-swivelling operating member having a part movable in applying the brake from an idle position spaced from the swivelling axis to an active position substantially in that axis, and a link perpendicular to the swivelling axis and connecting said part and said device.

8. A vehicle having, in combination, a swivelled wheel having a brake, a brake-operating toggle swivelling with the wheel, a non-swivelling operating member having a part movable in applying the brake from an idle position spaced from the swivelling axis to an active position substantially in that axis, and a link pivotally connected at its ends to said part and said toggle and arranged substantially perpendicular to the swivelling axis.

9. A vehicle having, in combination, a swivelled wheel having a drum, an expansible friction device within the drum having adjacent free ends, a device for forcing said free ends outwardly against the drum, and an operating lever having a part engaging said device and movable from an idle position spaced from the swivelling axis to an active position substantially in that axis.

10. A vehicle having, in combination, an axle, a wheel swivelled to the axle and having a drum, an expansible friction device within the drum having adjacent free ends, a device for forcing said free ends outwardly against the drum, and an operating lever fulcrumed on the axle having its end engaging said device and movable from an idle position spaced from the swivelling axis to an active position substantially in that axis.

11. A vehicle having, in combination, a swivelled wheel having a drum, an expansible friction device within the drum having adjacent free ends, a device for forcing said free ends outwardly against the drum, and an operating lever having a part engaging said device and movable substantially perpendicular to the swivelling axis toward that axis from an idle position spaced a considerable distance from that axis.

12. A vehicle having, in combination, a swivelled wheel having a drum, an expansible friction device within the drum, expanding means for said device within the drum arranged outside of the swivelling axis, a part for operating said expanding means, and a lever for applying the brake having a portion operatively engaging said part, said portion of the lever moving in applying the brake substantially perpendicular to the swivelling axis toward that axis.

13. A vehicle having, in combination, a swivelled wheel having a drum, a friction device engageable with the drum, means for forcing the friction device against the drum arranged outside of the swivelling axis, a part for operating said means, and a lever for applying the brake having a portion operatively engaging said part, said portion of the lever moving in applying the brake substantially perpendicular to the swivelling axis toward that axis.

14. A vehicle having, in combination, a swivelled wheel, a brake for the wheel having an applying device shiftable slightly circumferentially, and operating connections for said device including a universal joint arranged at least when the brake is applied in the swivelling axis and having the double function of permitting the swivelling of the wheel and of permitting the shifting of the applying device.

15. A vehicle having, in combination, a swivelled wheel, a brake for the wheel having an applying device shiftable slightly about an axis intersecting the swivelling axis at right angles, and operating connections for said device including a universal joint arranged at least when the brake is applied at the intersection of the two axes and having the double function of permitting the swivelling of the wheel and of permitting the shifting of the applying device.

16. A vehicle having, in combination, a swivelled wheel, a brake swivelling with the wheel and having an applying device shiftable slightly about an axis intersecting the swivelling axis substantially at right angles, and operating connections for said device including a part swivelling with the wheel and a non-swivelling lever having a portion engaging said part, said portion of the lever being movable in applying the brake from an idle position spaced from the swivelling axis to an active position substantially at the intersection of the two axes.

17. A vehicle having, in combination, a swivelled wheel, a brake swivelling with the wheel and having an applying device shiftable slightly about an axis intersecting the swivelling axis substantially at right angles, and operating connections for said device including a part swivelling with the wheel and a non-swivelling lever having a portion engaging said part, said portion of the lever being movable in applying the brake from an idle position spaced from both of said axes to an active position substantially at their intersection.

18. A vehicle having a swivelled wheel with a drum, and, in combination therewith, a brake engageable with the drum and shiftable about the axis of rotation of the wheel, and applying means for the brake including parts universally movable relatively to each other when the brake is appiled about the intersection of the swivelling axis with the axis of rotation of the wheel, to permit both the swivelling of the wheel and the shifting of the brake.

19. A vehicle having a swivelled wheel with a drum, and, in combination therewith, a brake engageable with the drum and shiftable about the axis of rotation of the wheel, and applying means for the brake including parts universally movable relatively to each other when the brake is applied about the intersection of the swivelling axis with the axis of rotation of the wheel, to permit both the swivelling of the wheel and the shifting of the brake, the point of engagement of said parts being spaced materially from said axes when the brake is not applied.

20. A vehicle having a swivelled wheel with a drum, and, in combination therewith, a brake engageable with the drum and shiftable about the axis of rotation of the wheel, and applying means for the brake including a universal joint arranged when the brake is applied substantially at the intersection of the swivelling axis with the axis of rotation of the wheel.

21. A vehicle having a swivelled wheel with a drum, and, in combination therewith, a brake engageable with the drum and shiftable about the axis of rotation of the wheel, and applying means for the brake including a universal joint arranged when the brake is applied substantially at the intersection of the swivelling axis with the axis of rotation of the wheel, and moved to that position in applying the brake in a direction substantially at right angles to both of said axes.

In testimony whereof I have hereunto signed my name.

MONTGOMERY W. McCONKEY.